UNITED STATES PATENT OFFICE 2,285,625

α-PHENYLETHYL SUBSTITUTED ALKOXY-PHENOL

Fred Lowell Taylor and John E. Livak, Midland, Mich., assignors to The Dow Chemical Company, Midland, Mich., a corporation of Michigan No Drawing. Application April 27, 1940, Serial No. 331,944

9 Claims. (Cl. 260—613)

This invention concerns certain new substituted phenols, and in particular relates to α-phenylethyl or α-(halophenyl)-ethyl substituted alkoxy-phenols of the general formula

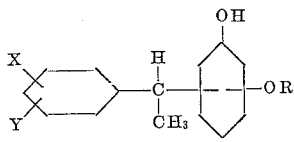

wherein X and Y each represent hydrogen or halogen, and R represents a lower alkyl group, i. e. an alkyl group containing not more than six carbon atoms, and wherein the α-phenylethyl group occupies a position ortho or para to the hydroxyl group. These compounds are for the most part high-boiling viscous liquids which are substantially insoluble in water but are readily dissolved by such organic solvents as methanol, acetone, chlorobenzene, ethanol, etc. They are useful in the preparation of phenol-aldehyde type resins and as intermediates in the manufacture of certain types of plasticizing agents.

The new products having the above general formula are prepared by reacting an α-phenylethyl halide or α-(halo-phenyl)-ethyl halide, such as α-phenylethyl chloride, α-(2-bromophenyl)-ethyl bromide, α-(2.4-dichlorophenyl)-ethyl chloride, etc. with an alkoxy-phenol, such as 2-methoxy-phenol, 4-ethoxy-phenol, 3-isopropoxy-phenol, 4-isopentoxy-phenol, etc. The reaction is conveniently carried out simply by heating a mixture of the reactants to a temperature at which hydrogen halide is readily evolved. Such temperature depends somewhat upon the particular reactants employed but is usually between about 100° C. and about 200° C. If desired, the reaction may be carried out under reduced pressure or in a current of an inert gas in order to facilitate removal of the hydrogen halide. Upon completion of the reaction, as indicated by the cessation of hydrogen halide evolution, the substituted phenol product is recovered from the reaction mixture and purified by fractional distillation under reduced pressure or by crystallization from a suitable solvent.

The new compounds may also be prepared by reacting styrene or a nuclear halogenated styrene with an alkoxy-phenol in the presence of an acid catalyst.

The following examples will illustrate the preparation of several of the new compounds of the present class, but are not to be construed as limiting the invention.

Example 1

In a flask fitted with a reflux condenser, thermometer, stirrer, and dropping funnel, 124 grams (1.0 mole) of guaiacol was heated to a temperature of about 110° C. and 70 grams (0.5 mole) of α-chloroethylbenzene was added from the dropping funnel over a period of 1¼ hours. The hydrogen chloride which was evolved during the reaction was absorbed in cold water. Heating was continued at 120° C. under 18 millimeters pressure for 6 hours to insure completion of the reaction. The reaction mixture was then fractionally distilled under reduced pressure whereby the product, an α-phenylethyl-2-methoxy-phenol, was obtained as a colorless viscous liquid distilling at approximately 155°–157° C. under 2 millimeters pressure and having a specific gravity of about 1.109 at 25/25° C. and an index of refraction of 1.5812 at 25° C. This product may be represented by the formula

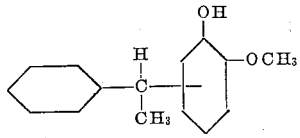

wherein the α-phenylethyl substituent occupies a position ortho or para to the hydroxyl group.

Example 2

62 grams (0.50 mole) of guaiacol was heated to a temperature of about 205°–210° C. and 52.3 grams (0.25 mole) of α-chloroethyl-2.4-dichlorobenzene was added over a period of one hour as in Example 1. The heating was continued at 216° C. for one hour to complete the reaction. The reaction mixture was then fractionally distilled under reduced pressure whereby the product, α-(2.4-dichlorophenyl)-ethyl-2-methoxyphenol, was obtained as a colorless viscous liquid distilling at approximately 180° C. under 2 millimeters pressure and having a refractive index of 1.5967 at 25° C. This product may be represented by the formula

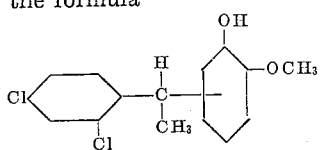

wherein the α-(2.4-dichlorophenyl)-ethyl group occupies a position ortho or para to the hydroxyl group.

Example 3

248 grams (2.0 mole) of guaiacol was heated to a temperature of about 150° C. and 219 grams (1.0 mole) of α-bromoethyl-4-chlorobenzene was added over a period of ¾ hour as in Example 1. The heating was continued for one hour to complete the reaction. The reaction mixture was then fractionally distilled under reduced pressure whereby the product, α-(4-chlorophenyl)-ethyl-2-methoxy-phenol, was obtained as a colorless viscous liquid distilling at approximately 177°–182° C. under 2 millimeters pressure and having a specific gravity of about 1.212 at 25/25° C., and an index of refraction of 1.5902 at 25° C. This product may be represented by the formula

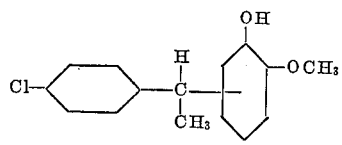

wherein the α-(4-chlorophenyl)-ethyl group occupies a position ortho or para to the hydroxyl group.

Other compounds of the present class which may be prepared by similar procedure are 4-(α-phenylethyl) 2-ethoxy-phenol, 4-(α-(2-bromophenyl)-ethyl)-2-isopropoxy-phenol, 2-(α-(2.4-dibromophenyl)-ethyl)-4-methoxy-phenol, 4-(α-phenyl-ethyl)-2-(n-hexoxy)-phenol, 4-(α-phenylethyl)-2-tertiary-butoxy-phenol, 4-(α-(3-bromophenyl)-ethyl)-3-methoxy-phenol, 2-(α-phenylethyl)-4-sec. butoxy-phenol, etc.

Other modes of applying the principle of our invention may be employed instead of those explained, change being made as regards the process or materials herein disclosed, provided the product stated by any of the following claims or the equivalent of such stated product be obtained.

We claim:

1. A substituted phenol having the general formula

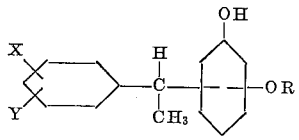

wherein X and Y each represents a substituent selected from the class consisting of hydrogen, chlorine, and bromine, R represents a lower alkyl group, and the α-arylethyl substituent occupies one of the positions ortho and para to the hydroxyl group.

2. A substituted phenol having the general formula

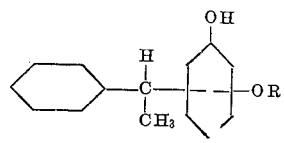

wherein R represents a lower alkyl group and the α-phenylethyl substituent occupies one of the positions ortho and para to the hydroxyl group.

3. A substituted phenol having the general formula

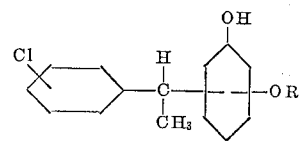

wherein R represents a lower alkyl group and the α-(chlorophenyl)-ethyl substituent occupies one of the positions ortho and para to the hydroxyl group.

4. A substituted phenol having the general formula

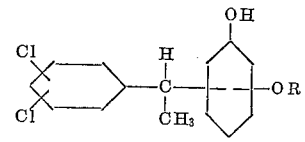

wherein R represents a lower alkyl group and the α-(di-halophenyl)-ethyl substituent occupies one of the positions ortho and para to the hydroxyl group.

5. A substituted phenol having the general formula

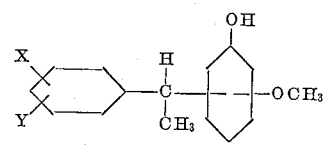

wherein X and Y each represents a substituent selected from the group consisting of hydrogen, chlorine, and bromine atoms and the α-arylethyl substituent occupies one of the positions ortho and para to the hydroxyl group.

6. An α-phenylethyl-2-methoxy-phenol distilling at approximately 155°–157° C. under 2 millimeters pressure, and having a specific gravity of about 1.109 at 25/25° C.

7. An α-(4-chlorophenyl)-ethyl-2-methoxy-phenol distilling at approximately 177°–182° C. under 2 millimeters pressure, and having a specific gravity of about 1.212 at 25/25° C.

8. An α-(2.4-dichloro-phenyl)-ethyl-2-methoxy-phenol distilling at approximately 180° C. under 2 millimeters pressure.

9. The method of preparing phenylethyl substituted alkoxy phenols selected from the group consisting of α-phenylethyl, α-(chlorophenyl)-ethyl, and α-(bromophenyl)-ethyl substituted alkoxy-phenols which comprises heating an alkoxy-phenol to a reaction temperature with an agent selected from the class consisting of α-phenylethyl, α-(chlorophenyl)-ethyl, and α-(bromophenyl)-ethyl halides.

FRED LOWELL TAYLOR.
JOHN E. LIVAK.